(12) United States Patent
Prissok et al.

(10) Patent No.: US 10,597,531 B2
(45) Date of Patent: Mar. 24, 2020

(54) ELECTRICALLY CONDUCTIVE PARTICLE FOAMS BASED ON THERMOPLASTIC ELASTOMERS

(71) Applicant: BASF SE, Ludwigshafen (DE)

(72) Inventors: Frank Prissok, Lemfoerde (DE); Michael Harms, Diepholz (DE); Markus Schuette, Melle (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/557,671

(22) PCT Filed: Mar. 3, 2016

(86) PCT No.: PCT/EP2016/054536
§ 371 (c)(1),
(2) Date: Sep. 12, 2017

(87) PCT Pub. No.: WO2016/146395
PCT Pub. Date: Sep. 22, 2016

(65) Prior Publication Data
US 2018/0051171 A1   Feb. 22, 2018

(30) Foreign Application Priority Data
Mar. 13, 2015 (EP) .................................. 15159048

(51) Int. Cl.
| | |
|---|---|
| C08J 9/224 | (2006.01) |
| C08L 75/04 | (2006.01) |
| C08J 9/232 | (2006.01) |
| A43B 7/36 | (2006.01) |
| A43B 13/04 | (2006.01) |
| B29C 35/08 | (2006.01) |
| C08K 3/04 | (2006.01) |
| C08K 5/103 | (2006.01) |
| B29L 31/00 | (2006.01) |
| B29K 75/00 | (2006.01) |
| B29L 31/50 | (2006.01) |
| B29C 44/34 | (2006.01) |
| B29K 105/00 | (2006.01) |
| B29K 21/00 | (2006.01) |

(52) U.S. Cl.
CPC ............... *C08L 75/04* (2013.01); *A43B 7/36* (2013.01); *A43B 13/04* (2013.01); *B29C 35/0805* (2013.01); *C08J 9/224* (2013.01); *C08J 9/232* (2013.01); *C08K 3/04* (2013.01); *C08K 5/103* (2013.01); *B29C 44/3461* (2013.01); *B29C 2035/0855* (2013.01); *B29K 2021/003* (2013.01); *B29K 2075/00* (2013.01); *B29K 2105/251* (2013.01); *B29K 2995/0005* (2013.01); *B29L 2031/504* (2013.01); *B29L 2031/712* (2013.01); *C08J 2201/036* (2013.01); *C08J 2201/038* (2013.01); *C08J 2205/052* (2013.01); *C08J 2205/06* (2013.01); *C08J 2207/00* (2013.01); *C08J 2300/22* (2013.01); *C08J 2300/26* (2013.01); *C08J 2375/04* (2013.01)

(58) Field of Classification Search
CPC ......... C08J 9/16–20; C08K 3/04; C08K 3/042
See application file for complete search history.

(56) References Cited

U.S. PATENT DOCUMENTS

| | | | | |
|---|---|---|---|---|
| 4,158,031 A | * | 6/1979 | Reuter ................... | B65D 81/00 252/511 |
| 4,496,627 A | * | 1/1985 | Azuma ................. | C04B 32/005 427/105 |
| 6,358,459 B1 | | 3/2002 | Ziegler et al. | |
| 2008/0234400 A1 | * | 9/2008 | Allmendinger ..... | B29C 44/3461 521/57 |
| 2010/0222442 A1 | * | 9/2010 | Prissok .............. | C08G 18/4854 521/60 |
| 2012/0329892 A1 | | 12/2012 | Prissok et al. | |
| 2016/0208069 A1 | * | 7/2016 | Lee ........................ | C08J 9/0066 |

FOREIGN PATENT DOCUMENTS

| | | | |
|---|---|---|---|
| DE | 10 2013 012 515 A1 | 3/2014 | |
| EP | 0 588 321 A1 | 9/1993 | |
| EP | 0705682 A1 * | 4/1996 | ............ B01J 19/126 |
| EP | 1 016 354 A1 | 12/1999 | |
| GB | 1588314 * | 4/1981 | |
| WO | 01/64414 A1 | 9/2001 | |
| WO | 2005/023920 A1 | 3/2005 | |
| WO | 2007/023091 A1 | 3/2007 | |
| WO | 2007/082838 A1 | 7/2007 | |

(Continued)

OTHER PUBLICATIONS

"Property—Commercial Graphite" by AZO materials. Accessed at https://www.azom.com/article.aspx?ArticleID=1630 (Year: 2002).*
Machine translation of JP 60141732A by Yoshihiro et al. (Year: 1985).*
International Search Report dated May 4, 2016, in PCT/EP2016/054536 filed Mar. 3, 2016.

(Continued)

*Primary Examiner* — Kara B Boyle
*Assistant Examiner* — Christina H. W. Rosebach
(74) *Attorney, Agent, or Firm* — Oblon, McClelland, Maier & Neustadt, L.L.P.

(57) ABSTRACT

Foam beads based on thermoplastic elastomers and having a coating comprising at least one electrically conductive substance, processes for producing same by coating the foam beads with an emulsion of a conductive substance in a plasticizer, and also processes for producing bead foams by joining the foam beads together thermally via high-frequency electromagnetic radiation.

14 Claims, No Drawings

(56) References Cited

FOREIGN PATENT DOCUMENTS

WO    2013/153190 A1    10/2013
WO    2014/198779 A1    12/2014

OTHER PUBLICATIONS

Extended European Search Report dated Aug. 14, 2015 in Patent Application No. 15159048.6 (with English translation of categories of cited documents).

* cited by examiner

ELECTRICALLY CONDUCTIVE PARTICLE FOAMS BASED ON THERMOPLASTIC ELASTOMERS

The present invention relates to foam beads based on thermoplastic elastomers and having a coating comprising electrically conductive substances, to processes for producing same by coating the foam beads with an emulsion of a conductive substance in a plasticizer, and also to processes for producing bead foams by joining the foam beads together thermally via high-frequency electromagnetic radiation.

Bead foams, such as polypropylene or polystyrene bead foams, typically are fused together with superheated steam in automatic molding machines to form shaped articles for the packaging industry for example. TPU bead foams can be further processed not only by superheated steam fusion but also by in situ foaming or adhering with reactive polyurethane systems. Since superheated steam fusion has very high energy requirements, alternatives are sought. Fusion by means of hot air is possible in principle, but does not as yet yield satisfactory parts.

In a currently widely practiced process for fabricating component parts, the pre-foamed beads are fused together thermally by means of water vapor. The previously foamed beads are sucked air-pneumatically out of a silo into the pressure fill unit of the molding machine, compressed with compressed air and blown into the mold. Since the beads do not contain any further blowing agent for foaming, they are transported into the mold in the compressed state (backpressure process). The individual beads are fused together using water vapor as heat transfer medium at a steaming pressure between 2.5 and 3.5 bar. After fusion, the molded part is cooled and the foam pressure sufficiently reduced for the molded part to be demolded. A description of the process for, for example, EPP beads is found in EP 0 588 321 A1.

Expanded thermoplastic polyurethane (E-TPU) is a very recent entrant for bead foams in that E-TPU can be fused together similarly to the above-described processes to form high-resilience component parts which, by virtue of the excellent adherence between the beads, can be exposed to extreme dynamic stresses. Foamed materials based on thermoplastic elastomers and their methods of making are known, for example, from WO 2005/023920, WO 2007/082838, WO 2013/153190 and WO 2014/198779.

Industrial applicators have long been calling for component parts in antistatic and electrically conductive polymer foams for applications such as antistatic/conductive shoe soles in the electrical and electronics industry, lightweight parts for radiation shields, detectable foams or electrically heatable foams.

These foams have hitherto been manufactured by directly injecting a conductive substance into the polymer mixture in a sufficient concentration for the individual conductive regions or beads to touch each other and thereby ensure dissipation of the current. The substance concentrations required for this are so very high (often >10 wt %) that the mechanical properties of the base polymer are severely compromised.

U.S. Pat. No. 4,496,627 describes electrically conductive foam beads at least partially covered with an electrically conductive layer. The electrically conductive layer may be applied before or after foaming. In one embodiment, polypropylene foam beads are coated by mixing with a high molecular weight polymer dispersion comprising graphite or carbon black and dried. High coating rates are needed to achieve the desired conductivity.

WO 2007/023091 describes polystyrene foam beads having a polymer coating comprising waterglass and athermanous compounds such as graphite or carbon black, which are pressure sintered in the absence of water vapor to form shaped foam articles.

An alternative way of bonding the foam beads together thermally is by high-frequency fusion as described inter alia in WO 2001/64414. In high-frequency fusion, the foamed beads, in particular of expandable polystyrene (EPS), expanded polypropylene (EPP) or expandable polyethylene terephthalate (EPET) which are to be fused together are surrounded with a liquid medium absorbing electromagnetic radiation, water for example, and then joined together by applying a form of electromagnetic radiation such as, for example, microwaves. Owing to the water imbibition due to the higher polarity of thermoplastic polymers, this process is only marginally possible for foam beads comprising thermoplastic elastomers. In addition, the 100° C. temperature attainable on boiling water under atmospheric pressure is usually insufficient to fuse the elastomer beads together. The water imbibition allows the water to penetrate excessively into the beads, and the heating is effective not just at the points of contact but also within the beads. As a result, the beads may collapse prior to being fused.

DE 10 2013 012 515 A1 describes a process for joining foam beads, in particular EPP or EPS, together thermally by inductive heating with an improved energy balance. However, the production of shaped parts by inductive heating presupposes some electrical conductivity on the part of the beads, at least at the surfaces to be joined together. This is attainable by coating with electrically conductive fillers such as, for example, metallic powder or carbon black, nanotubes. Spraying is an example of a possible way to coat the beads.

The problem addressed by the present invention was that of remedying the disadvantages mentioned and of providing foam beads capable of being processed thermally by means of high-frequency electromagnetic radiation, in particular microwave radiation, to form bead foams and also a process for producing the foam beads. The problem addressed by the present invention is further that of providing foam beads capable of processing with even minimal amounts of additives to form conductive bead foams.

The problem was solved by foam beads based on thermoplastic elastomers and having a coating comprising electrically conductive substances.

Useful thermoplastic elastomers include, for example, thermoplastic polyurethanes (TPU), thermoplastic polyester elastomers (e.g., polyether esters and polyester esters), thermoplastic copolyamides (e.g., polyether copolyamides) or thermoplastic styrene-butadiene block copolymers. Foam beads based on thermoplastic polyurethane (TPU) are particularly preferred.

The foam beads are obtainable by impregnating thermoplastic elastomer pellets with a blowing agent in suspension, or by melt impregnation of molten thermoplastic elastomer with a blowing agent and subsequent pelletization. Suitable processes for producing the foam beads based on thermoplastic elastomers are described for example in WO 2005/023920, WO 2007/082838, WO 2013/153190 and WO 2014/198779.

The thermoplastic elastomers employed to produce the foam beads preferably have a Shore hardness in the range from 30 A to 82 D, preferably in the range from 65 A to 96 A, determined to DIN 53505. The elongation at break of the thermoplastic elastomers employed is preferably above 50%, preferably in the range from 200 to 800%, as measured to DIN EN ISO 527-2.

The coating comprises at least one electrically conductive substance. Electrically conductive substances are understood as those having a conductivity of at least $10^5$ S/m, preferably in the range from $10^6$ to $10^8$ S/m, at 300 k. Preferably used electrically conductive substances are solids such as graphite, carbon black or carbonyl iron powder. The coating preferably takes the form of a dispersion of the electrically conductive substances in a plasticizer which, after application, is imbibed by the thermoplastic elastomer, so the coating consists essentially of the electrically conductive substance and, more particularly, does not contain polymeric binders, such as acrylate resins or emulsion polymers. It is particularly preferable for the electrically conductive coating to consist of graphite.

The bulk density of the coated foam beads is preferably in the range from 30 to 250 kg/m$^3$.

The proportion of electrically conductive substances is preferably in the range from 0.1 to 1 wt %, based on the coated foam beads, when the coating on the foam beads and the bead foams obtainable therewith are to be electrically conductive. Even relatively minor proportions of electrically conductive substances are generally sufficient for fusing by means of high-frequency electromagnetic radiation.

The electrically conductive substances may be applied to the foam beads as powder, solution or dispersion using customary coating techniques, such as spraying, dipping or wetting, with and without additional auxiliary material. Customary mixers, spraying devices, dipping devices and/or drum apparatus may be employed for this purpose. It is particularly preferred for the foam beads to be coated with an emulsion of a conductive substance in a plasticizer. Plasticizers are chemical substances which are added to plastics in order to make the latter extensible, flexible or supple. Examples of plasticizers are phthalates, alkylsulfonic esters, polyethers, esterified polyethers, polyurethanes, linear polyurethanes, low molecular weight polyamides, citric esters, adipic esters, diisononyl 1,2-cyclohexanedicarboxylate and glycerol esters.

It is particularly preferred for the foam beads to be coated with an emulsion of graphite in 1,2,3-propanetriol triacetate (triacetin).

Otherwise functional coatings are also possible. Abrasion-resistant or low-melting polyurethane coatings, for example. By way of further additives for inclusion in the coating there may be mentioned substances such as boron nitride and aluminum oxide which absorb thermal and/or IR radiation, which in the processes described are capable of delivering a closed network within an E-TPU component part. It is also possible to effect coloration with very small amounts of pigment in the coating without having to bulk color the foam beads.

It is further possible to apply various fibers (plastic, glass, metal) to the surface of the foam beads before fusion, to form their own network within the component parts after processing. This may provide improved mechanical properties.

It was found that, surprisingly, the additization of the foam beads in the manner of the present invention—with a coating of electrically conductive substances—ensures a microwave absorption sufficient for fusion.

The invention accordingly also provides a process for producing bead foams by joining above-described foam beads according to the invention together thermally using high-frequency electromagnetic radiation, in particular using microwaves. High-frequency electromagnetic radiation is understood to be that with frequencies of at least 100 MHz. In general, electromagnetic radiation in the frequency range between 100 MHz and 300 GHz is used. Preference is given to using microwaves in the frequency range between 0.5 and 100 GHz, particularly preferably 0.8 to 10 GHz, and irradiation times between 0.1 and 15 minutes.

The electrically conductive substances employed for coating in the manner of the present invention make it possible to fuse the foam beads together across a very wide frequency range. It is even in frequency ranges where water is not made to resonate that the coated foam beads heat up preferentially at the contact faces.

In a preferred embodiment, the foam beads of the invention are initially coated thinly with the conductive substance in a tumbling mixer, placed in a mold that does not absorb microwaves and then fused using a microwave.

Owing to its polarity, E-TPU tends to imbibe plasticizers of the type known for example from PVC chemistry. This effect is exploitable for coating the beads in a simple and rapid manner. E-TPU is admixed with a pasty mixture of plasticizer and coating material (e.g., graphite) by stirring. The coating material becomes finely disbursed over the surface of the E-TPU beads and firmly adheres to it via the plasticizer. In the course of the further treatment and/or heating of the E-TPU beads, the plasticizer will (in contrast to PS and PP beads) penetrate into the E-TPU beads and so does not disrupt the adherence between the individual foam beads when they are joined together thermally to form bead foams.

The invention further provides bead foams obtainable by the above-described process of the invention.

Since, after fusion, a honeycomb-shaped, conductive three-dimensional structure pervades the shaped foam article, the shaped article will exhibit permanent conductivity by virtue of the fused-in beads. This effect is not attainable by simply using graphite or carbon black as filler because, in this case, the fillers would be homogenously dispersed in the interior of the foam beads.

The foam beads of the present invention, which are based on thermoplastic elastomers, can be used to produce electrically conductive parts which comprise a very high level of conductivity coupled with a very low proportion of additives, such as graphite, since the substance responsible for the conductivity is not, as hitherto customary, randomly dispersed in the polymer, but is only present as a network in concentrated form on the surface of the individual polymer beads, but is not present in the interior of the beads.

The bead foams of the present invention preferably have a specific volume resistivity of less than $10^6$ [$\Omega$ mm$^2$/m].

Applications for the bead foams of the present invention are conceivable in all markets where a particularly resilient yet lightweight material of construction is required, for example in protective packaging, i.e., the intelligent packaging of highly sensitive goods. However, they are also useful for sports floors and also for applications in automotive construction or mechanical engineering.

Owing to their antistatic and elastomeric properties, the bead foams of the present invention are useful for applications in the sports, footwear and packaging sectors, for example as safety footwear or as packaging for electronic components or instruments.

The thermal and electrical conductivities of the foams according to the present invention change on lengthening or shortening. A resilient foam will respond to compression with a change in its conductivity and/or specific volume resistivity, and this could be utilized as a pressure sensor for example.

EXAMPLES

Materials Used:
E-TPU Infinergy® 32-100 U10, expanded, predominantly closed-cell foam beads based on thermoplastic polyurethane, obtained by expansion of pelletized Elastollan® from BASF Polyurethanes GmbH under pressure and high temperature, bulk densities 110 g/l and 150 g/l.
Graphite emulsion: emulsion of graphite of not less than 99.5% purity in triacetin (1,2,3-propanetriol triacetate)
The exemplified parts by weight of graphite powder and plasticizer were stirred with a dispersing rod (Ultra Turrax) in a glass beaker until homogeneous.
Iron emulsion: emulsion of carbonyl iron powder (finely dispersed iron powder deposited from the gas phase, with not less than 99% purity and a particle size below 10 µm) in triacetin (1,2,3-propanetriol triacetate) The exemplified parts by weight of carbonyl iron powder and plasticizer were stirred with a dispersing rod (Ultra Turrax) in a glass beaker until homogeneous.
Adhesive: Elastopave 6550/101 from BASF Polyurethanes GmbH, compact 2-component polyurethane system
Apparatus:
MLS-Ethos plus laboratory microwave system having a maximum power output of 2.5 kW.
Methods of Measurement:
Bulk density was determined by filling a 200 ml vessel with the expanded beads and determining the weight by weighing. An accuracy of ±5 g/l may be assumed here.
The densities of the foam sheets were determined to DIN EN ISO 1183-1 A.
The compressive strength of the foam sheets was measured in accordance with DIN EN ISO 3386 at 10%, 25%, 50% and 75% compression.
Compression set was determined for the foam sheets (shoe foam) after conditioning (6 h/50° C./50%) to ASTM D395.
The rebound resilience of the foam sheets was determined to DIN 53512.
Elongation at break and tensile strength were determined to DIN 53504.
Conductivity and specific volume resistivity were determined in accordance with DIN EN 61340.

Example B1

97 parts by weight of the E-TPU foam beads having a bulk density of 110 g/l were mixed in a vessel together with an emulsion of 0.4 part by weight of graphite and 2.6 parts by weight of triacetin on an electrical laboratory roller track. The E-TPU foam beads became enveloped with a complete, homogeneous layer of graphite in the course of 6 h.

52 grams of the loose individual beads thus enveloped were filled into a paperboard mold measuring 220 mm×110 mm×15 mm. The paperboard lid exerted slight pressure on the beads. This filled mold was placed upright at a 50° angle on the outer edge of the laboratory microwave turntable and irradiated at 400 watts for 90 seconds. Following a short period of cooling down, a coherent sheet of foam could be removed.

Example B2

97.9 parts by weight of the E-TPU foam beads having a bulk density of 150 g/l were mixed in a vessel together with an emulsion of 0.2 part by weight of graphite and 1.9 parts by weight of triacetin on a laboratory roller track. The E-TPU foam beads became enveloped with a complete, homogeneous layer of graphite in the course of 6 h.

60 grams of the loose individual beads thus enveloped were filled into a paperboard mold measuring 220 mm×110 mm×15 mm. The paperboard lid exerted slight pressure on the beads. This filled mold was placed upright at a 50° angle on the outer edge of the laboratory microwave turntable and irradiated at 400 watts for 120 seconds. Following a short period of cooling down, a coherent sheet of foam could be removed.

Example B3

97 parts by weight of the E-TPU foam beads having a bulk density of 150 g/l were mixed in a vessel together with an emulsion of 0.4 part by weight of graphite and 2.6 parts by weight of triacetin on an electrical laboratory roller track. The E-TPU foam beads became enveloped with a complete, homogeneous layer of graphite in the course of 6 h.

48 grams of the loose individual beads thus enveloped were filled into a mold of Ultrason E2010 (polyether sulfone) from BASF SE measuring 150 mm×150 mm×70 mm. A moveable Ultrason lid exerted slight pressure on the beads. The filled mold was placed on the outer edge of the laboratory microwave turntable and irradiated at 400 watts for 90 seconds. Following a short period of cooling down, a coherent sheet of foam could be removed.

Example B4

91.2 parts by weight of the E-TPU foam beads having a bulk density of 150 g/l were mixed in a vessel together with an emulsion of 6 parts by weight of iron carbonyl powder having a particle size <10 µm and 2.8 parts by weight of triacetin on an electrical laboratory roller track. The E-TPU foam beads became enveloped with a complete, homogeneous layer of graphite in the course of 6 h.

56 grams of the loose individual beads thus enveloped were filled into a mold of Ultrason E2010 (polyether sulfone) from BASF SE measuring 150 mm×150 mm×70 mm. A moveable Ultrason lid exerted slight pressure on the beads. The filled mold was placed on the outer edge of the laboratory microwave turntable and irradiated at 400 watts for 110 seconds. Following a short period of cooling down, a coherent sheet of foam could be removed.

Comparative Test V1:
60 g of uncoated E-TPU foam beads having a density of 110 g/l were fused together using water vapor to form shaped foam articles.

Comparative Test V2:
60 g of uncoated E-TPU foam beads having a density of 110 g/l were fused together using 9 wt % of an adhesive to form shaped foam articles.

Comparative Test V3:
60 g of uncoated E-TPU foam beads having a density of 110 g/l were fused together using 23 wt % of an adhesive to form shaped foam articles.

The properties of the foam sheets from Examples B1-B4 and Comparative Tests V1-V3 are summarized in table 1.

The foam sheets from Examples B1 and B2 exhibit a higher rebound resilience versus the adhered foam sheets from Comparative Tests V2 and V3.

It is further advantageous that the microwave fusion (Examples B1 and B2) allows lower component part weights than are possible by water vapor fusion (Comparative Test V1). An increase in the rebound resilience and a reduction in density are considered advantageous. Also of particular advantage is the high electrical conductivity of the foam sheets from Examples B1 to B4 versus the foam sheets fused together in standard fashion with water vapor (Comparative Test V1) and the adhered foam sheets (V2 and V3).

TABLE 1

Properties of foam sheets from Examples B1 and B2 and Comparative Tests V1-V3

| | B1 | B2 | B3 | B4 | V1 | V2 | V3 |
|---|---|---|---|---|---|---|---|
| Compressive strength 10% [kPa] | 15 | 30.4 | | | 78 | 20.3 | 26.8 |
| Compressive strength 25% [kPa] | 52.8 | 103.8 | | | 170 | 53 | 60.3 |
| Compressive strength 50% [kPa] | 151.6 | 275.7 | | | 366.7 | 142 | 156.9 |
| Compressive strength 75% [kPa] | 718.4 | 1607.3 | | | 1822 | 540.3 | 669.5 |
| Density [g/l] | 165 | 229 | | | 253.5 | 135 | 152 |
| Compression set [%] (6 h/50° C./50%) | 72 | 62 | | | 28.9 | 43 | 35 |
| Rebound resilience [%] | 59 | 64 | | | 70 | 55 | 55 |
| Tensile strength [kPa] | 64 | 294 | | | 1168 | 120 | 292 |
| Elongation at break [%] | 13 | 37 | | | 108 | 32 | 42 |
| Specific volume resistivity [Ω mm²/m] | $6.6*10^3$ | $6.3*10^3$ | $6.5*10^3$ | $4.9*10^5$ | $1.7*10^{11}$ | $1.3*10^{11}$ | $1.6*10^{11}$ |

We claim:

1. Foam beads comprising: a base which comprises a thermoplastic elastomer; and a coating provided on a surface of the base, the coating essentially consisting of at least one electrically conductive substance,
    wherein a proportion of a total of the at least one electrically conductive substance ranges from 0.1 to 1 wt %, based on the foam beads.

2. The foam beads according to claim 1, wherein the thermoplastic elastomer comprises a thermoplastic polyurethane.

3. The foam beads according to claim 1, wherein the coating consists of graphite.

4. The foam beads according to claim 1, having a bulk density ranging from 30 to 250 kg/m³.

5. A process for producing the foam beads of claim 1, the process comprising coating foam beads with an emulsion of a conductive substance in a plasticizer selected from the group consisting of a phthalate, an alkylsulfonic ester, a polyether, a polyurethane, a low molecular weight polyamide, a citric ester, an adipic ester, a diisononyl 1, 2-cyclohexanedicarboxylate and a glycerol ester.

6. The process according to claim 5, wherein foam beads of a thermoplastic polyurethane are coated with an emulsion of graphite in 1,2,3-propanetriol triacetate.

7. A process for producing bead foams, the process comprising joining the foam beads of claim 1 together thermally using high-frequency electromagnetic radiation.

8. The process according to claim 7, wherein the foam beads are joined thermally using microwaves in a frequency range between 100 MHz and 300 GHz.

9. A bead foam obtainable by the process according to claim 7, wherein the bead foam has a specific volume resistivity of less than $10^6$ [Ω mm2/m].

10. A packaging or footwear, comprising the bead foam of claim 9.

11. The foam beads according to claim 1, wherein the coating consists of the at least one electrically conductive substance.

12. The foam beads according to claim 2, wherein the coating consists of graphite.

13. The foam beads according to claim 2, having a bulk density ranging from 30 to 250 kg/m³.

14. The foam beads according to claim 2, wherein the coating consists of the at least one electrically conductive substance.

* * * * *